United States Patent [19]

Shannon

[11] Patent Number: 5,020,150
[45] Date of Patent: May 28, 1991

[54] COMBINATION RADIO AND EYEGLASSES

[76] Inventor: John Shannon, 1215 Elgin, Houston, Tex. 77004

[21] Appl. No.: 432,849
[22] Filed: Nov. 7, 1989
[51] Int. Cl.⁵ .............................................. H04B 1/08
[52] U.S. Cl. .................................... 455/343; 455/344; 455/351
[58] Field of Search ............... 455/344, 349, 350, 351, 455/348, 347, 343; 351/41, 158; D16/102, 103

[56] References Cited

U.S. PATENT DOCUMENTS

| | | | |
|---|---|---|---|
| D. 207,919 | 6/1967 | Fai | D57/1 |
| D. 212,863 | 12/1968 | Roberts | |
| 3,247,330 | 4/1966 | Hinman | |
| 4,856,086 | 8/1989 | McCullough | 455/344 |
| 4,882,769 | 11/1989 | Gallimore | 455/344 |

FOREIGN PATENT DOCUMENTS 0105125  5/1986  Japan ................................. 455/343

Primary Examiner—Curtis Kuntz
Attorney, Agent, or Firm—Terry M. Gernstein

[57] ABSTRACT

A combination of a radio and eyeglasses includes an antenna that is wrapped around the lenses of the eyeglasses and extends across the nose bridge element to obtain improved reception. The radio includes a power source that has a battery and a solar energy converter so the radio can be played for great lengths of time. Earphones are mounted on the skull pieces of the eyeglass frames to be placed in a wearer's ear.

2 Claims, 2 Drawing Sheets

COMBINATION RADIO AND EYEGLASSES

TECHNICAL FIELD OF THE INVENTION

The present invention relates to the general art of radios and to the particular field of combinations which include radios.

BACKGROUND OF THE INVENTION

Many people enjoy activities, such as jogging, walking, and the like, that can be pursued while listening to a radio. Heretofore, these people were required to carry heavy radios with them as they exercised or the like. This was a cumbersome situation, especially if the user did not have a pocket to carry the radio.

Therefore, small radios and receivers have been developed that can be placed in a pocket and listened to via headphones. While better than the prior art, such devices still required some means of carrying the radio. The art thus has included wrist straps, waist bands, and the like that have pockets to carry small radios. However, while better than the prior art, this solution still presents a cumbersome situation.

While the art has also included radios combined with other devices, such as ear muffs, or the like, such presently available devices still are often cumbersome to carry and still have several shortcomings.

For example, these radios often use batteries for power, and the batteries often become depleted after only a few hours use. In the case of a long walk, or a marathon run, such limited lifetime of the power source can present a problem.

Still further, these devices, due to their miniature nature, do not always have the best reception. This is especially so if the device is being used by a walker or a jogger who is in an area that is remote from a radio station transmitter.

Often, these devices do not have the ability to switch bands so that the user if forced to listen to a single type of program.

Therefore, there is a need for a radio set that is conveniently usable by a person engaged in another activity, yet will have the ability to play for extended periods of time and establish good reception for a variety of bands even in areas remote from broadcast transmitters.

OBJECTS OF THE INVENTION

It is a main object of the present invention to provide a radio set that is conveniently usable by a person engaged in another activity.

It is another object of the present invention to provide a radio set that is conveniently usable by a person engaged in another activity, yet will have the ability to play for extended periods of time.

It is another object of the present invention to provide a radio set that is conveniently usable by a person engaged in another activity, yet will have the ability to play for extended periods of time and establish good reception for a variety of bands.

It is another object of the present invention to provide a radio set that is conveniently usable by a person engaged in another activity, yet will have the ability to play for extended periods of time and establish good reception for a variety of bands even in areas remote from broadcast transmitters.

SUMMARY OF THE INVENTION

These, and other, objects are achieved by a combination of a radio receiver and eyeglasses. The radio receiver is mounted in the eyeglasses in a manner that will keep the eyeglasses comfortable to wear, even for long periods of time, and includes a battery power source that is backed up by a solar energy driven power source. The radio also includes means for changing bands between AM and FM stations, and has an antenna that is embedded in the frame and surrounds the eyeglass lens holding area.

In this manner, the radio can be played while exercising and can be played for extended periods of time without raising the possibility of discomfort or of having the power source deplete. Reception will be good, even in remote areas due to the existence of an antenna.

This combination can include regular corrective-type eyeglasses, or nonprescription sunglasses. Thus, nearly anyone will have access to a radio that can be carried in a convenient and comfortable manner that will have good reception of a variety of stations for extended periods of time.

BRIEF DESCRIPTION OF THE DRAWING FIGURES

DETAILED DESCRIPTION OF THE PREFERRED EMBODIMENT OF THE INVENTION

Figure 1:
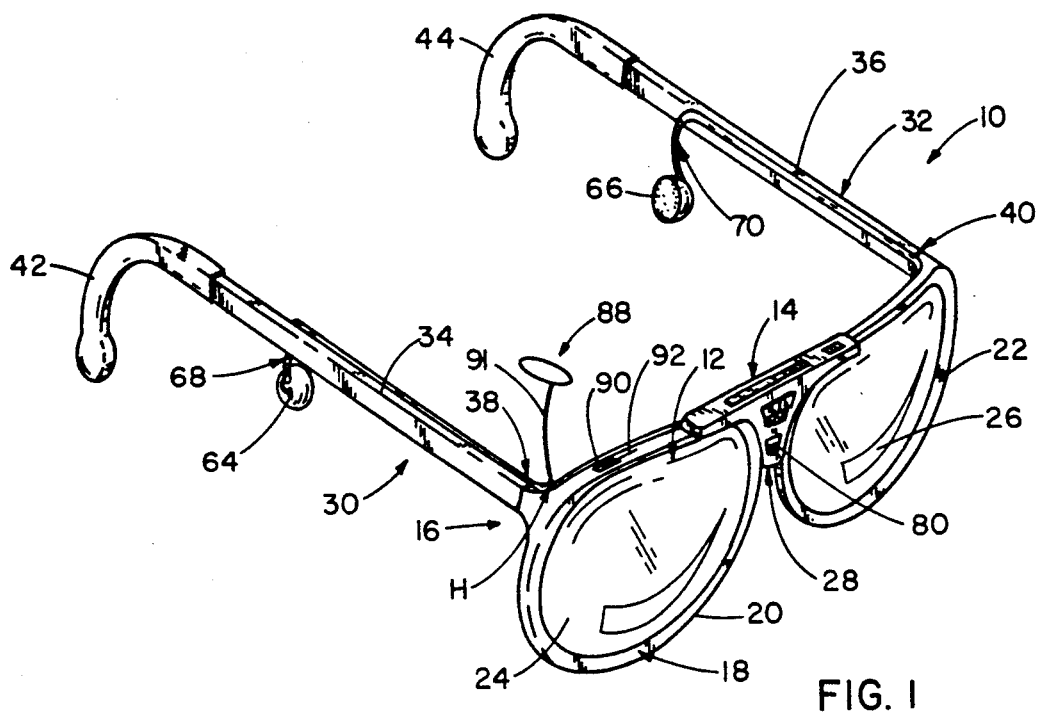
FIG. 1 is a perspective view of combination eyeglasses and radio embodying the present invention.
Figure 2:
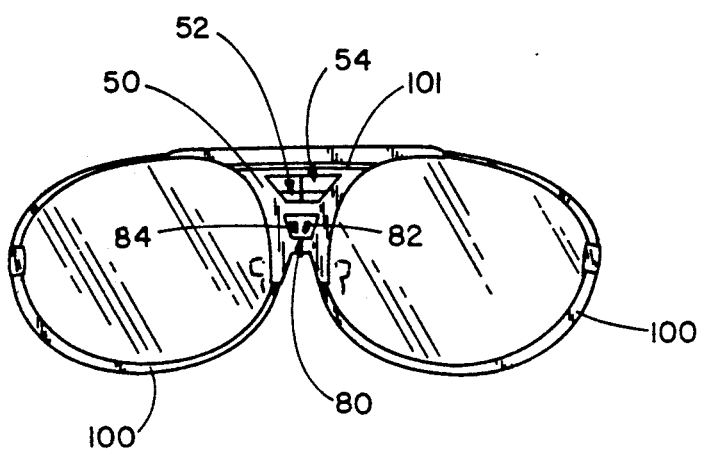
FIG. 2 is a front elevational view of the combination of the present invention.
Figure 3:
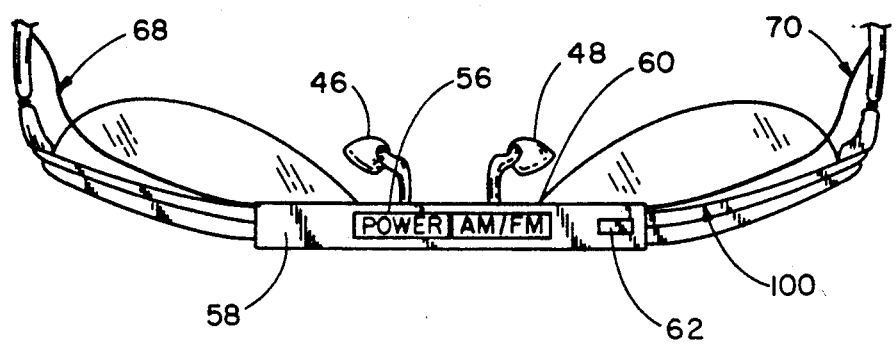
FIG. 3 is a top plan view thereof.

Shown in FIGS. 1, 2 and 3 is a combination 10 of an eyeglass assembly 12 and a radio assembly 14. The eyeglass unit can be associated with prescription glasses or simple non-prescription sunglasses if so desired.

The eyeglass unit includes a frame 16 having a front unit 18 having two lens-holding elements 20 and 22 which hold lenses 24 and 26 respectively. The lenses can be prescription or non-prescription, darkened or clear or photosensitive or the like. The lenses can even be a mirror finish if suitable. A nose bridge element 28 connects the two lens-holding elements together and serves to support the frame unit on the wearer's face. Two temple pieces 30 and 32 which include skull pieces 34 and 36 which are attached to the lens-holding elements by hinges 38 and 40 respectively to move the temple pieces between a closed configuration adjacent to the frame front unit and an open configuration as shown in FIG. 1 in position to support the eyeglass unit on the wearer's face via contact with the wearer's ears. The skull pieces include ear-engaging end pieces 42 and 44 for further supporting the eyeglass unit on the wearer.

The nose bridge element further includes two nose pads 46 and 48 which engage the wearer's nose to support the eyeglass unit in the desired position on the wearer's face in a comfortable manner.

The radio assembly 14 of the combination includes a miniature radio receiver unit 50 mounted in the nose bridge element 28 to be positioned directly above the wearer's nose and to have its weight distributed evenly between the nose bridge nose pads. The receiver includes a volume control 52 mounted in the nose bridge element adjacent to a tuning control 54. An on/off power control switch 56 is mounted on the top surface 58 of the nose bridge element adjacent to a band selection control 60. A speaker control 62 is mounted on the top surface 58 adjacent to the band selection control 60 to control the volume in each of the earphones 64 and 66 which are electrically connected to the radio receiver via line conductors 68 and 70.

Figure 4:
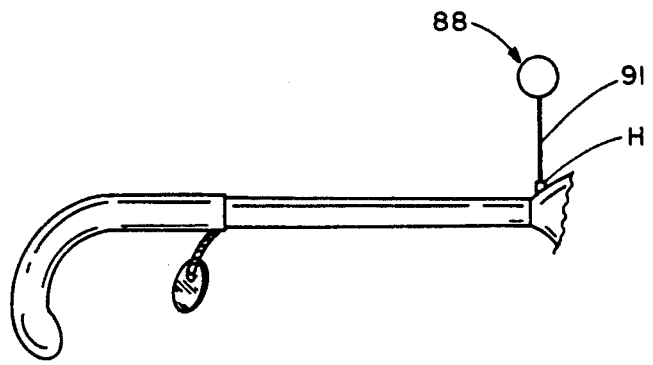
FIG. 4 is a side elevational view of the skull piece attached to the front of the frame and having an earphone attached thereto.

As is best shown in FIGS. 1 and 4, the earphones are mounted on the skull pieces by the line conductors 68 and 70 to depend downwardly from such skull pieces into a position to engage a wearer's ear. The line conductors are flexible adjacent to the earphones so these earphones can be moved into place as necessary.

The radio assembly further includes a power source 80 that is mounted in the nose bridge element. The power source 80 includes a battery 82 mounted in the nose bridge element close to the wearer's nose and intermediate between the nose pads so the weight of the battery is distributed to the nose pads.

The battery is the primary source of power for the radio, but has a limited lifetime. Therefore, the radio assembly includes a solar energy power source that supplements the battery. This solar energy power source is a photovoltaic solar energy converter 84 which is connected to the radio assembly in parallel with the battery via suitable diodes C and other such isolating elements so that two parallel power sources can operate in the same circuit without damaging either power source. The solar energy converter can also be connected to the batter via a charger element BC to charge such battery when the solar energy power source is operating to drive the radio assembly.

The photovoltaic solar energy converter includes a solar energy concentrator 88 mounted on the frame adjacent to a hinge, such as hinge 38, and which concentrates solar energy onto a collector array 90 mounted by a support post 91 that is hingeably mounted on the frame top surface 58 adjacent to that concentrator by a hinge H. The concentrator is collapsible against the top surface 58 when it is not in use so that it will not interfere with the wearer's comfort. The collector array is electrically connected to the radio assembly via a line conductor 92.

A power sensing device PS is included in the battery circuit to sense the power level of the battery and switch to the solar energy converter source when the power level of the battery drops below a certain level. Such power sensing and switching elements are known in the art.

Figure 5:
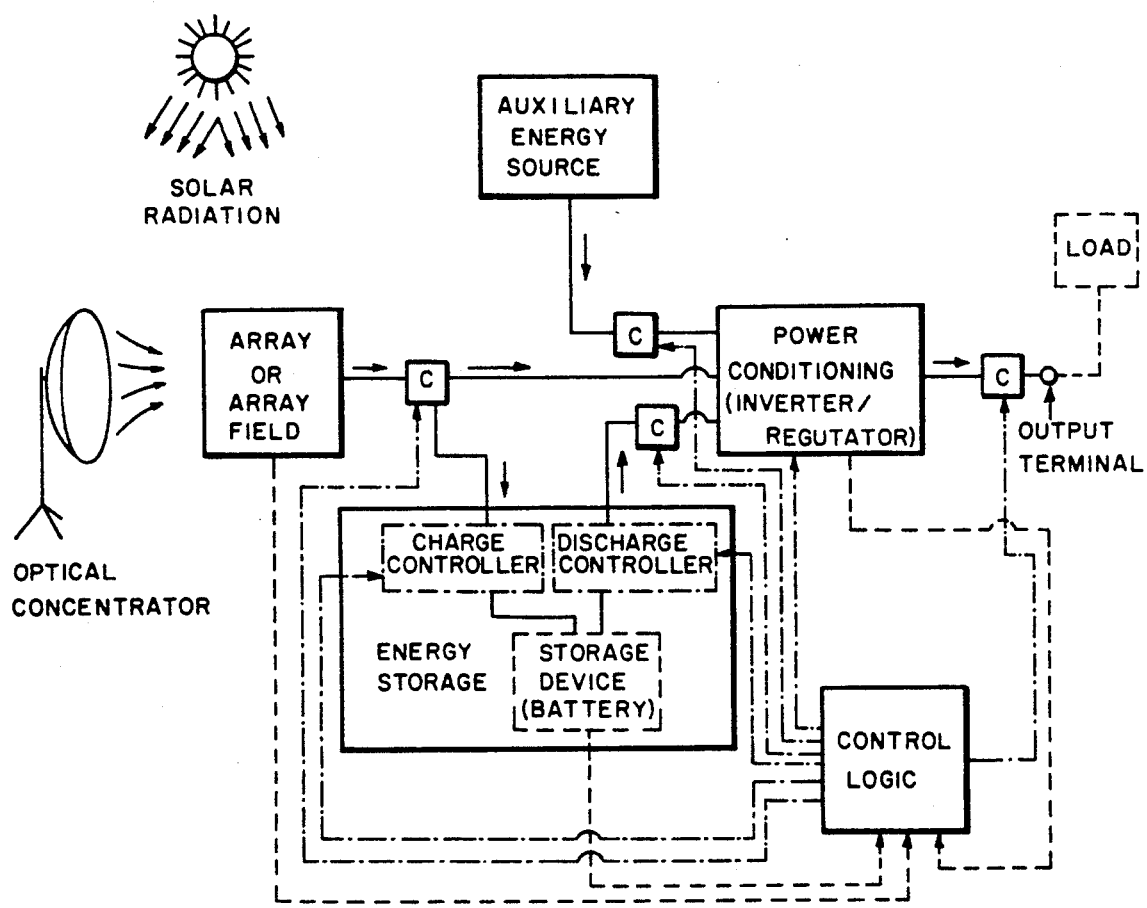
FIG. 5 is a schematic illustrating an auxiliary power source comprised of a photovoltaic solar power system.

The photovoltaic solar energy converter is shown schematically in FIG. 5, and fully discussed in standard textbooks such as "Energy Conversion" by Sheldon S. L. Chang, published by Prentice Hall in 1963 (Chapter 6, pages 177-194) and in handbooks such as "Handbook of Modern Electronics and Electrical Engineering" edited by Charles Belove and published by Wiley and Sons in 1986 (pages 440-482), the disclosures of which are incorporated herein by reference.

As can be seen in FIG. 5, the circuit can be set up so that the battery operates as the backup power source and operates through the solar energy converter. This is an alternative since this mode of operation requires the concentrator 88 to be deployed. The load indicated in FIG. 5 is the radio assembly.

As is best shown in FIGS. 2 and 3, the radio receiver assembly includes an antenna 100 that is embedded in the frame lens-holding elements to surround the lenses 22 and 24. This surrounding relationship permits the antenna to be longer than otherwise possible, and thus will improve reception of the radio receiver without adding discomfort to the eyeglasses. The antenna extends across the nose bridge element at 101.

It is understood that while certain forms of the present invention have been illustrated and described herein, it is not to be limited to the specific forms or arrangement of parts described and shown.

I claim:

1. A combination comprising: p1 A) an eyeglass frame having
   (1) a front unit which includes two lens-holding elements and a top surface,
   (2) a nose bridge element connecting said lens-holding elements together,
   (3) two nose pads each being attached to one of said lens-holding elements,
   (4) two temple pieces each of which includes
      (a) a skull piece,
      (b) a hinge on a front end of said skull piece attaching said skull piece to one lens-holding element of said two lens-holding element, and
      (c) an end piece on a rear end of said skull piece for supporting said skull piece on a wearer's ear, and
   (5) an eyeglass lens mounted in each of said two frame lens-holding elements; and
   B) a radio assembly mounted in said eyeglass frame and including
   (1) a radio receiver unit mounted in said nose bridge element and including
      (a) a volume control located in said nose bridge element,
      (b) an on/off switch located in said nose bridge element,
      (c) a tuning control located in said nose bridge element,
      (d) a speaker control located in said nose bridge element,
      (e) a band selector located in said nose bridge element top surface, and
      (f) two stereo earphones, each being mounted on one of said skull pieces and electrically connected to said radio receiver unit by a line connector, said earphones depending downwardly from said skull pieces with said line connectors being flexible so that said earphones can be placed in a wearer's ears,
   (2) a power source mounted in said frame and including
      (a) a battery located in said nose bridge element and connected to said radio receiver,
      (b) a photovoltaic solar energy converter power source mounted on said front unit and being connected to said radio receiver in parallel with said battery and supplementing said battery, said photovoltaic solar energy converter power source including
         (i) a solar energy concentrator mounted on said eyeglass frame top surface adjacent to one of said temple piece hinges, (ii) a solar energy concentrator hinge mounted on said eyeglass frame, (iii) a support post connecting said solar energy concentrator to said solar energy concentrator hinge for moving said solar energy concentrator from a collapsed configuration against said front unit top surface to a deployed configuration spaced from said front unit top surface, (iv) a solar energy collector array mounted on said front unit top surface adjacent to said solar energy concentrator to have solar energy concentrated thereon by said solar energy concentrator when said solar energy concentrator is in said deployed configuration, (c) an electrical isolating diode connecting said battery to said photovoltaic solar energy converter for permitting said parallel connected battery and photovoltaic solar energy converter power source to operate without damage to either said battery or said photovoltaic solar energy converter due to said parallel connection, (d) a battery charger element electrically connecting said photovoltaic solar energy power converter to said battery for charging said battery using solar energy, and (e) a power sensing device connected to said battery to sense power level in said battery and switch to said photovoltaic solar energy converter power source when power level in said battery drops below a certain level.

2. The combination defined in claim 1 wherein said battery is located intermediate to said two nose pads.

* * * * *